Patented Aug. 13, 1929.

1,724,420

UNITED STATES PATENT OFFICE.

CHARLES F. RITCHIE AND WILLIAM A. GALE, OF TRONA, CALIFORNIA, ASSIGNORS, BY MESNE ASSIGNMENTS, TO AMERICAN POTASH & CHEMICAL CORPORATION, OF NEW YORK, N. Y., A CORPORATION OF DELAWARE.

ART OF REFINING BORAX.

No Drawing.   Application filed January 27, 1925.   Serial No. 5,133.

This invention, in its broadest terms, relates to the production of borax, substantially free of phosphates, from solids or liquors containing borates and phosphates.

In the liquors resulting from the evaporation and manipulation of certain natural saline waters, such as the brine from Searles Lake in California, considerable quantities of soluble phosphates occur with the liquors containing soluble borates.

We are aware of the fact that the $P_2O_5$ content of the Searles Lake brine is less than one tenth of one per cent of the total weight of brine. However, in the normal operation of a cyclical process where end liquors are returned for re-evaporation, the $P_2O_5$ content builds up, until the solubility of some phosphate salt is reached whereupon it is precipitated from the liquors.

It is a well known fact that the phosphates, carbonates and borates of the alkali metals exist in several forms, these forms differing as regards the ratio of alkali metal oxide to $P_2O_5$, $CO_2$ and $B_2O_3$. In the aforementioned liquors we find equilibrium conditions existing between these alkali metal salts of weak acids; that is to say, the borates may be present as metaborate and tetraborate, the carbonates as monocarbonate and bicarbonate, and the phosphates as dibasic phosphate and tribasic phosphate.

In a companion application for Letters Patent, we have described our discovery of a double salt of trisodium phosphate and sodium metaborate, having a very slight solubility. We have further discovered that borax crystallized from certain liquors resulting from the evaporation and manipulation of Searles Lake brine ofttimes contains appreciable quantities of phosphates. We have also discovered this phosphate impurity to be essentially the aforementioned double salt $Na_3PO_4.NaBO_2.18H_2O$, or
$(Na_3PO_4)_2.Na_2B_2O_4.36H_2O$.

As we have previously explained, in liquors resulting from the evaporation of brines containing alkali metal salts of weak acids such as the concentrated brine of Searles Lake, there obtains an equilibrium or partition between these alkali metal salts of weak acids. For this reason such a liquor containing considerable amounts of phosphate is always possessed of sufficient of the proper ingredients to form the double salt of the above formula, and does so when conditions of temperature and concentration obtain appropriate values. As we have pointed out in our companion application, the solubility of the double salt is much lower than other common phosphates of sodium, so that it is precipitated from such liquors after much less concentration than would be the case were only the normal phosphate salts present.

Our present invention relates to the production of borax essentially free from phosphate impurities from solutions or salts containing such impurities. The invention is based upon the discovery that the solubility of the double salt above referred to can be increased by treating a solution containing the borax together with such impurities with a reagent capable of increasing the acidity or decreasing the alkalinity (pH value) of the solution, and by crystallizing out the borax or boric acid from the resulting solution. The reagents utilized to increase the solubility of the double salt and permit the crystallization of the boric acid compound are, in general, of an acid character or of such a character as will increase the acidity or reduce the alkalinity (pH value) of the solution, depending upon the product desired. The borax may be crystallized out as such, or, where boric acid is desired, a sufficient amount of acid may be used to convert the borax to boric acid which may then be crystallized substantially free from phosphates. The invention can be carried out in a variety of ways which will be illustrated by the following more detailed description.

One method that we have found quite satisfactory is the addition of small amounts of a mineral acid, such as sulfuric acid, to the liquor, prior to crystallizing the borax therefrom. The resulting crystal borax was found to be of high quality and essentially free from phosphates.

Another method that we have found to be equally efficient in carrying out our invention is the treatment of the liquors with an acid gas such as carbon dioxide, prior to crystallizing the borax therefrom. In this case we have also found our resulting product to be essentially free from phosphates.

Another method of consummating our invention is through the addition of an acid salt, such as sodium bicarbonate, to the solution prior to crystallizing the borax therefrom. By an acid salt we here mean a salt which is capable of reducing the pH value of a sodium hydroxide solution.

We do not wish to limit the usefulness of our invention to any of the specific materials above named, or to any special apparatus for administering the same, for we have successfully employed a variety of materials and apparatus. We have successfully carried out our invention, for example, in a coke-filled carbonating tower, in which the liquor to be treated was flowed downward counter current to flue gas.

We have also employed chlorine successfully in the operation of our invention. We have found this material to be doubly effective in that not only was the subsequently crystallized borax substantially free from phosphates, but also of a much whiter color.

While we have confined our description to the crystallization of borax from liquors resulting from the concentration and manipulation of Searles Lake brine, we do not wish to limit the usefulness of our invention to these materials alone. Our invention has been found to be equally valuable for the recrystallization or refining of impure borax containing phosphates combined with borates.

We have applied another modification of our invention to borax containing large amounts of phosphates. In order to recover the $B_2O_3$ value of such borax, we have added sufficient mineral acid, such as sulfuric acid, to convert the borax to boric acid, subsequently crystallizing the same substantially free from phosphates.

We claim:

1. The improved method of crystallizing essentially pure boric acid compounds from liquors containing phosphates and boric acid compounds in such proportions that boric acid compounds crystallized therefrom in substantial amounts would contain phosphates as impurities, which comprises treating such liquors with a reagent which reduces the alkalinity (pH value) of the solution thereby increasing the solubility of the phosphates, and crystallizing out the boric acid compound from the resulting solution substantially free from phosphates.

2. In the process which consists of crystallizing essentially pure borax from liquors containing phosphates and borax in such proportions that borax crystallized therefrom in substantial amounts would contain phosphate impurities, the step of treating the liquors with an acid gas prior to crystallization to increase the solubility of the phosphates.

3. The process of treating borax liquors containing phosphates and borax, in such proportions that borax crystallized therefrom in substantial amounts would contain phosphate impurities, with carbon dioxide to increase the solubility of the phosphates and effect the production of a borax essentially free from phosphates.

4. The process of treating borax liquors containing phosphates and borax, in such proportions that borax crystallized therefrom in substantial amounts would contain phosphates impurities, with flue gas to increase the solubility of the phosphates and effect the production of a borax substantially free from phosphates.

5. The process of recovering borate from a solution containing meta-borate and a double salt of tri-sodium phosphate and a sodium meta-borate in such proportions that a borate crystallized therefrom in substantial amounts would be contaminated with a phosphate, which comprises treating the solution to convert meta-borate to tetra-borate and crystallizing the tetra-borate from the resulting solution.

In testimony whereof we affix our signatures.

CHARLES F. RITCHIE.
WILLIAM A. GALE.